United States Patent Office.

HEINRICH LAUBMANN, OF HÖCHST-ON-THE-MAIN, GERMANY.

DYE FROM DINITRO-ANTHRACHRYSONE-DISULFO ACID.

SPECIFICATION forming part of Letters Patent No. 555,904, dated March 3, 1896.

Application filed January 11, 1895. Serial No. 534,564. (Specimens.) Patented in England July 10, 1893, No. 13,395.

*To all whom it may concern:*

Be it known that I, HEINRICH LAUBMANN, a citizen of the Empire of Germany, and a resident of Höchst-on-the-Main, in the Empire of Germany, have invented certain new and useful Improvements in the Production of Coloring-Matter from Dinitro-Anthrachrysone-Disulfonic Acid, (for which Letters Patent were granted by and with my consent to Lucius & Brüning in Great Britain, No. 13,395, dated July 10, 1893,) of which the following is a specification.

The dinitro-anthrachrysone-disulfonic acid, which is obtainable by nitrating anthrachrysone-disulfonic acid and characterized by the sodium salt, which crystallizes in magnificent golden-yellow leaflets of the composition $C_{14}H_4O_6(NO_2)_2(SO_3Na)_2.H_2O.$, can be converted into a valuable green coloring-matter, dyeing on mordants.

The manufacture of this coloring-matter is carried out with great ease by treating the aqueous solution of the dinitro-anthrachrysone-disulfonic acid mixed with rather more than the calculated quantity of alkali (most advantageously caustic soda or soda) with the calculated quantity of sodium sulfid. The solution turns a dark-red color and solidifies in a short time to a crystalline mass. The reaction is completed by warming and agitating for some time on a water-bath. On cooling the coloring-matter is filtered and well washed with dilute salt solution. The coloring-matter may be purified by dissolving in hot water, filtering and precipitation with salt.

The coloring-matter forms a black crystalline powder, soluble in hot water with red-blue color, which becomes red-violet on addition of alkali. It dissolves in concentrated sulfuric acid with a blue-red color. The solution fluoresces strongly red. It is difficultly soluble in glacial acetic acid with red color. In other usual organic solvents—such as alcohol, ether, benzene, acetone, &c.—the coloring-matter is practically insoluble.

The coloring-matter dyes on mordants and is also an acid-coloring matter, and dyes wool in an acid-bath in blue-green shades and wool with chromium mordant in pure-green shades. The shades obtained in an acid-bath can be shaded as required with metallic mordants—for instance, chromiumfluorid. The tints obtained with mordants withstand milling and are fast against light.

What I claim as new, and desire to secure by Letters Patent, is—

1. The process of making a green dye-stuff which consists in treating dinitro-anthrachrysone-disulfonic acid with sodium sulfid in alkaline solution, substantially as described.

2. As a new article of manufacture coloring-matter derived from anthrachrysone, being a black crystalline powder, soluble in hot water with red-blue color, in dilute alkali with red-violet color, in concentrated sulfuric acid with blue-red color, difficultly soluble in glacial acetic acid with red color and practically insoluble in the other usual organic solvents, and exhibiting the remarkable behavior toward wool that it is completely absorbed from an acid-bath and that the colored stuff gives green tints on treatment with chromiumfluorid.

In testimony that I claim the foregoing as my invention I have signed my name in presence of two subscribing witnesses.

HEINRICH LAUBMANN.

Witnesses:
 HEINRICH HAHN,
 BERNHARD LYDECKER.